(No Model.)
T. A. WATSON.
Microphone Transmitter.
No. 231,247. Patented Aug. 17, 1880.
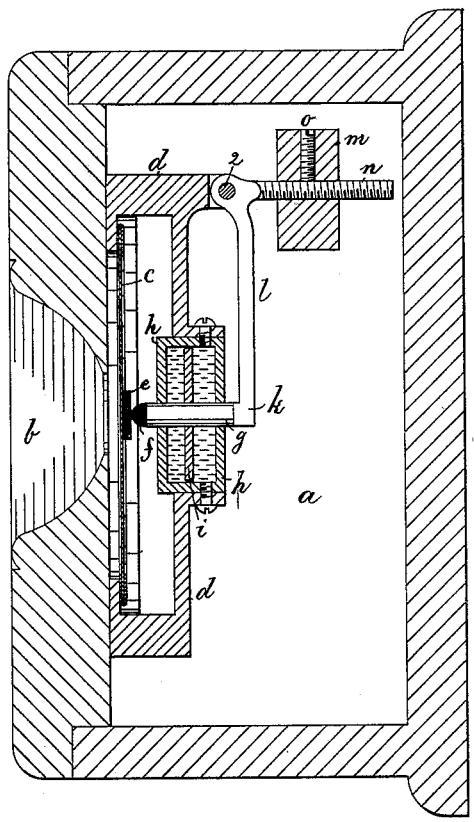
Witnesses.
Jos. P. Livermore
L. F. Connor
Inventor.
Thomas A. Watson
by Crosby & Gregory
Attys.
N. PETERS, PHOTO-LITHOGRAPHER, WASHINGTON, D.C.

United States Patent Office.

THOMAS A. WATSON, OF EVERETT, MASSACHUSETTS.

MICROPHONE-TRANSMITTER.

SPECIFICATION forming part of Letters Patent No. 231,247, dated August 17, 1880.

Application filed April 21, 1880. (No model.)

*To all whom it may concern:*

Be it known that I, THOMAS A. WATSON, of Everett, county of Middlesex, State of Massachusetts, have invented an Improvement in Microphone-Transmitters, of which the following description, in connection with the accompanying drawing, is a specification.

My invention relates to microphone-transmitters, and has for its object to provide a contact-point or electrode which will be rigid in its opposition to a second electrode in its rapid vibrations caused by the action of sound-waves on the usual diaphragm, thus insuring that the said diaphragm in its vibrations will compress the electrodes or contact-points instead of moving both of them bodily, the said contact-point being, however, adapted to follow the diaphragm in its slow movements caused by atmospheric influences or changes in the relative position of the parts due to warping or expansion and contraction and the like, and thus being enabled to retain a constant initial or normal pressure.

It is well understood that the usual microphone or carbon transmitter depends for its operation upon variations in the pressure of a carbon contact-point in an electric circuit, and that the said variations are caused by the vibrations of a diaphragm or point thereon to and from a second point, which I term "the rigid point," since it should be rigid relative to the vibrating point, as it is obvious that if the second point were not rigid, but perfectly free to follow the movements of the vibrating point, there would be no such variations in pressure. There should be a certain initial pressure between the said points, so that they may remain in actual contact during the entire vibrations, and it is desirable that this initial or normal pressure should, as far as possible, remain constant when once properly adjusted. The amplitude of vibrations is exceedingly minute, and the normal pressure should be slight, so that it is not practicable to have the rigid point absolutely fixed relative to the vibrating one, as by a rigid connection to the same frame-work, owing to the natural changes which take place in the form and dimensions of the said frame-work, no matter of what material it may be made, the contraction and expansion due to ordinary changes of temperature being sufficient to throw the said points out of adjustment, or to vary the initial or normal pressure to too great a degree. As usually constructed, the rigid point rests pressed against the vibrating one by a weight or spring, and thus is enabled to follow the slow movements of the said point, but is of sufficient mass to resist by its inertia the rapid vibrations caused by sound-waves to a considerable extent.

My invention consists in providing a fluid resistance for the rigid point which offers scarcely any perceptible opposition to a slow movement, but which may afford a resistance as great as that of the frame-work itself to oppose the rapid movements of the point or disk vibrated under the influence of sound. The initial or normal pressure may be caused by a weight constantly pressing the rigid point toward the vibrating one, and as the former will readily follow the latter in all its slow movements or gradual changes in position, the normal pressure will always remain the same, and may be properly adjusted once for all. As herein shown, the rigid point is connected with a rod which extends into and through a small cylinder supported on the frame-work and filled with a liquid, and is provided with a disk or piston loosely fitted in the said cylinder, or provided with a small opening to allow the liquid to pass slowly from one side to the other.

If the diaphragm is placed horizontal, the piston-rod and piston may be of the right weight to give the proper normal pressure; or if, as herein shown, the diaphragm is vertical, as is usually the case, the end of the said rod may be acted upon by a vertical arm of a bent lever, the other or horizontal arm thereof being provided with a weight, which may be placed at a greater or less distance from the fulcrum to properly adjust the normal pressure.

Should it be desired to have the instrument operate in any position the piston and rod may be provided with a counter-balance which will just balance its weight in any position, and the normal pressure may be applied and adjusted by a spring, and in any case the said pressure will remain as at first adjusted.

The drawing represents, in section, a microphone-transmitter provided with my invention.

The inclosing-case $a$, to contain the induction-coil and other apparatus, and provided with a mouth-piece, $b$, the diaphragm $c$, and its supporting frame-work $d$ may all be of any usual construction.

The diaphragm is shown as provided with a button, $e$, of carbon or any other suitable material, forming a part of the electric circuit and pressed by the vibrations of the diaphragm with greater or less force against the complementary contact-point $f$, (shown, also, of carbon,) which continues the electric circuit from the point $e$.

If desired, one of the carbon pieces may be omitted, or a platinum bead may be suspended between the diaphragm and the carbon $f$, or any of the usual modifications of the contact-electrodes may be employed.

The point $f$, which I term the "rigid point," since it should remain rigid and unmoved by the sound-vibrations of the diaphragm to thus cause all their force to be expended in compressing the contact-points, is secured upon one end of a stem or rod, $g$, extended through the opposite heads of a short cylinder, $h$, rigidly connected with the same frame-work $d$ which supports the diaphragm $c$.

The said rod $g$ is rigidly connected with a vane or piston, $i$, in the cylinder $h$, and the said cylinder is filled with a liquid, preferably alcohol or glycerine, surrounding the piston and its rod. The piston $i$ is loosely fitted in the cylinder or provided with a small opening through it to allow the liquid to slowly pass from one side to the other of the said piston if it should be moved from end to end of the cylinder.

A surrounding fluid will oppose but slight resistance to a piston or vane when moved through it very slowly, but will be more rigid than a solid to oppose the force of a sudden or rapid movement, so that a blow on the end of the rod $g$ would break the solid parts of the cylinder or piston before it would move the said piston through the liquid.

As herein shown, the diaphragm $c$ is vertical, and the rigid electrode $f$ is pressed against it in a horizontal direction by one end, $k$, of a bent lever, $l$, pivoted at 2 to the frame $d$, the pressure being derived from a weight, $m$, on the other arm, $n$, of the said lever, shown as screw-threaded, to enable the said weight to be readily and firmly adjusted thereon to give the desired normal pressure at $f$. When properly adjusted the weight may be fixed by a suitable set-screw, $o$.

If the diaphragm were to be used in a horizontal position and the point $f$ above it, the weight of the piston and piston-rod might be made sufficient to produce the required normal pressure; or if the point $f$ were to be below the diaphragm, it might be pressed up against it by a suitable weight and lever.

If desired to enable the apparatus to be used in any position, the piston-rod and piston could be counterbalanced by means of a weighted lever, so that there would always be equilibrium, and the normal pressure regulated by a spring, the force of which would not vary appreciably on account of the slight changes in relative position of diaphragm and frame-work $d$ and cylinder connected therewith.

Such changes in construction would readily be made to meet the requirements of the various cases.

I claim—

1. In a telephonic or sound transmitter to cause fluctuations in an electric current by variations in the pressure of suitable electrodes, a point to be vibrated under the influence of sound-waves, and a second point maintained, by fluid resistance, rigid or immovable to oppose the vibrations of the first point, substantially as and for the purpose described.

2. In a microphone-transmitter, the diaphragm, an electrode, and fluid resistance therefor, whereby the said electrode is maintained rigid to cause the force of vibration of the diaphragm to be expended in compressing the solid parts instead of moving the said point, and whereby, also, the said point is allowed a slow movement to compensate for change in relative position of the other parts, substantially as described.

3. In a microphone-transmitter, the diaphragm and complementary contact-point, combined with a cylinder and fluid therein and a vane or piston in said fluid connected with the said contact-point, substantially as and for the purpose described.

4. The diaphragm and a complementary contact-point therefor, maintained rigid to resist rapid movement by fluid resistance, combined with means to adjust the normal pressure between the said diaphragm and contact-points, substantially as described.

In testimony whereof I have signed my name to this specification in the presence of two subscribing witnesses.

THOMAS A. WATSON.

Witnesses:
JOS. P. LIVERMORE,
N. E. C. WHITNEY.